United States Patent
Koja et al.

(10) Patent No.: US 12,026,114 B2
(45) Date of Patent: Jul. 2, 2024

(54) PORT CONTROLLER AND ELECTRONIC DEVICE

(71) Applicant: ROHM CO., LTD., Kyoto (JP)

(72) Inventors: Nozomu Koja, Kyoto (JP); Kenichi Motoki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/903,525

(22) Filed: Sep. 6, 2022

(65) Prior Publication Data
US 2023/0083174 A1 Mar. 16, 2023

(30) Foreign Application Priority Data
Sep. 10, 2021 (JP) .................. 2021-147971

(51) Int. Cl.
*G06F 13/42* (2006.01)
*G06F 13/38* (2006.01)

(52) U.S. Cl.
CPC ........ *G06F 13/382* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| 11,749,954 B2 * | 9/2023 | Kim ................ H01R 29/00 710/313 |
| 2016/0117274 A1 * | 4/2016 | Waters ................ G06F 1/266 710/106 |
| 2019/0025897 A1 * | 1/2019 | Atkinson ............ G06F 11/1423 |
| 2020/0213452 A1 * | 7/2020 | Ito ................ H04N 1/00037 |

FOREIGN PATENT DOCUMENTS

JP 6604863 B2 11/2019

* cited by examiner

*Primary Examiner* — Henry Tsai
*Assistant Examiner* — Dean Phan
(74) *Attorney, Agent, or Firm* — CANTOR COLBURN LLP (57) ABSTRACT

The present disclosure provides a port controller and an electronic device. The port controller is compatible with a Universal Serial Bus (USB) Type-C standard and is used in a device operable as a sink device. The port circuit is communicable with an external main controller. A transceiver is communicable with a source device via a configuration channel (CC) pin of a receptacle. A control unit is capable of negotiating with the source device via the transceiver. A pin control circuit controls a state of the CC pin and monitors the state of the CC pin. A power supply circuit receives a bus voltage supplied from the source device and generates a power supply voltage of the main controller.

6 Claims, 4 Drawing Sheets

PORT CONTROLLER AND ELECTRONIC DEVICE

CROSS REFERENCE TO RELATED APPLICATIONS

The present invention claims priority under 35 U.S.C. § 119 to Japanese Application, 2021-147971 filed on Sep. 10, 2021, the entire contents of which are incorporated herein by reference.

TECHNICAL FIELD

The present disclosure relates to a power supply technique of an electronic device.

BACKGROUND

A battery driven device (electronic device) represented by a cellphone terminal, a smartphone, a tablet terminal, a laptop computer or a portable audio player is built-in with a rechargeable secondary battery, and a charging circuit for charging the secondary battery. Regarding a charging circuit, a charging circuit that charges a secondary battery by supplying an external direct-current (DC) voltage (bus voltage $V_{BUS}$) through Universal Serial Bus (USB) or a DC voltage from an external alternating-current (AC) adaptor is available.

The USB Power Delivery (to be referred to as USB PD) standard is regulated for power supply devices and power supply system using USB. In the USB PD standard, power supply up to a maximum of 100 W is supported. The USB PD standard is also adopted by the USB Type-C standard.

In USB Type-C, the power supply side is referred to as a source, and the power receiving side is referred to as a sink. A device having a source function (the role of a source) is also referred to as a provider or a source device, and a device having a sink function (the role of a sink) is also referred to as a consumer or a sink device.

To provide USB PD and Type-C functions, a port controller integrated circuit (IC) in charge of control related to USB PD and Type-C is used.

The port controller IC provides functions of a physical layer and a logical layer of USB Type-C. The port controller IC has functions of detecting a source device based on a state of a Configuration Channel (CC) port and performing a negotiation via the CC pin.

Regarding the port controller IC, there are port controller ICs that operate under the control of the main controller of the electronic device, and port controller ICs that operate completely independently.

A port controller IC that operates under the control of the main controller acquires information associated with power required by the electronic device and the like from the main controller. Thus, in a state in which a battery of an electronic device is being discharged and a main controller is inoperable, the port controller IC is incapable of performing an initial negotiation (power negotiation).

PRIOR ART DOCUMENT

Patent Publication

[Patent document 1] Japan Patent Publication No. 6604863

SUMMARY OF THE PRESENT DISCLOSURE

Problems to be Solved by the Disclosure

Under the Universal Serial Bus Power Delivery (USB PD) standard, a Channel Configuration (CC) pin is pulled down by a resistor Rd, and a device being used in considered as a sink device. Thus, while a battery is fully discharged (powerless battery state), standby is performed in when the CC pin is pulled down, power can be received when a connection to a source device is available, thereby performing a startup from the powerless battery state.

Herein, the sink device has a bus switch provided on a wire from a VBUS (power supply line) pin to an internal circuit. While the bus switch is turned off, a bus voltage VBUS is not supplied to an internal circuit. That is to say, an internal main controller is not started, so a port controller cannot acquire initial information needed for an initial negotiation.

The present disclosure is accomplished in view of the situation above, and it is an exemplary object of an aspect thereof to provide a port controller capable of performing an initial negotiation in a powerless battery state.

Technical Means for Solving the Problem

According to an aspect of the present disclosure, a port controller is compatible with a Universal Serial Bus (USB) Type-C standard and is used in a device operable as a sink device. The port controller includes: an interface circuit, communicable with an external main controller; a transceiver, communicable with a source device via a configuration channel (CC) pin of a receptacle; a control unit, capable of negotiating (negotiable) with the source device via the transceiver; a pin control circuit, controlling a state of the CC pin and monitoring the state of the CC pin; and a power supply circuit, receiving a bus voltage supplied from the source device and generating a power supply voltage of the main controller.

Moreover, an aspect obtained from any combination of the elements above, or an aspect obtained from conversions between expressions of methods and devices of the present disclosure may also effectively serve as an embodiment of the present disclosure.

Effects of the Disclosure

According to an aspect of the disclosure, a powerless battery operation can be achieved.

DETAILED DESCRIPTION OF THE EMBODIMENTS

Summary of Embodiments

A summary of several embodiments of the present disclosure is given below. The summary serves as the preamble of the detailed description to be given shortly and aims to provide fundamental understanding of the embodiments by describing several concepts of one or more embodiments in brief. It should be noted that the summary is not to be construed as limitations to the scope of the present disclosure. The summary is not a general summary of all conceivable embodiments, nor does it intend to specify important elements of all embodiments or to define the scope of a part of or all aspects. For the sake of better description, "one embodiment" sometimes refers to one embodiment (implementation example or variation example) or multiple embodiments (implementation examples or variation examples).

A port controller according to an embodiment is compatible with a Universal Serial Bus (USB) Type-C standard and is used in a device operable as a sink device. The port controller includes: an interface circuit, communicable with an external main controller; a transceiver, communicable with a source device via a configuration channel (CC) pin of a receptacle; a pin control circuit, controlling a state of the CC pin and monitoring the state of the CC pin; and a power supply circuit, receiving a bus voltage supplied from the source device and generating a power supply voltage of the main controller.

In a powerless battery state, even if a bus switch is turned off, the power supply voltage generated by the power supply circuit of the port controller is provided to the main controller, thereby enabling a startup of the main controller. Next, after the startup of the main controller, the port controller can receive information needed for a negotiation from the main controller and performs an initial negotiation with a target device (source device).

In one embodiment, the port controller may further include a switch driver for controlling a bus switch connected to a VBUS pin of the receptacle. The switch driver turns on the bus switch in response to an instruction from the main controller. After a bus voltage VBUS at an appropriate voltage level is supplied via the initial negotiation, the main controller provides to the port controller an instruction for turning on the bus switch by using a condition that an internal circuit is normal, accordingly enabling a system to operate safely.

In one embodiment, the port controller may further include a switch driver for controlling a bus switch connected to a VBUS pin of the receptacle. The control unit may provide to the switch driver the instruction for turning on the bus switch after the initial negotiation is completed. In this case, provided that a condition that an internal circuit is normal is used, the main controller provides an instruction for starting the initial negotiation, that is, a system is enabled to operate safely.

Embodiments

Appropriate embodiments are given with the accompanying drawings below. The same or equivalent constituting elements, parts and processes are represented by the same denotations, and repeated description is omitted as appropriate. Moreover, the embodiments are non-limiting to the present disclosure but are exemplary. All features and combinations thereof described in the embodiments are not necessarily intrinsic features or combinations of the present disclosure.

In the description of the application, an expression "a state of component A connected to component B" includes, in addition to a situation where component A and component B are physically directly connected, a situation where component A is indirectly connected to component B via another component, without the another component resulting in substantial influences on their electrical connection or impairing functions or effects exerted by their connection.

Similarly, an expression "a state of component C connected (disposed) between component A and component B" includes, in addition to a situation where component A and component C, or component B and component C are directly connected, a situation where they are indirectly connected via another component, without the another component resulting in substantial influences on their electrical connection or impairing functions or effects exerted by their connection.

Figure 1:
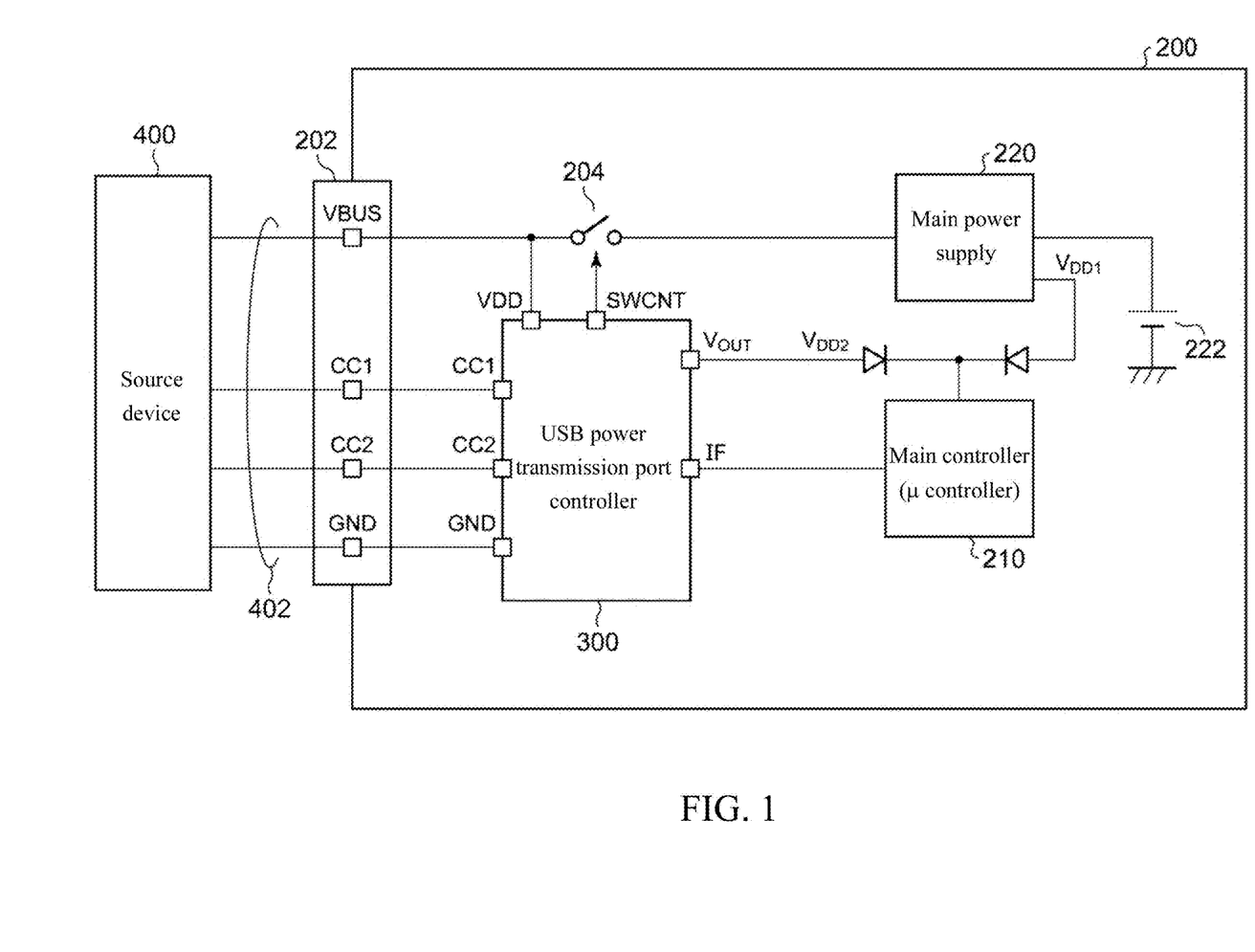
FIG. 1 is a block diagram of an electronic device having a port controller according to an embodiment.

FIG. 1 shows a block diagram of an electronic device 200 having a port controller 300 according to an embodiment. The electronic device 200 includes the port controller 300, a receptacle 202, a bus switch 204, a main controller 210, a main power supply 220 and a battery 222. In addition to including the modules shown herein, the electronic device 200 further includes modules corresponding to intrinsic functions.

The receptacle 202 of the electronic device 200 is connectable to a source device (also referred to as a target device) 400 via a USB cable 402. The electronic device 200 can become a consumer in the USB Type-C standard and can be powered by the source device 400. The main power supply 220 may include a charging circuit, which charges the battery 222 using power from the source device 400.

The receptacle 202 includes a $V_{BUS}$ pin, a CC1 pin, a CC2 pin and a GND (ground) pin. The receptacle 202 of the electronic device 200 is connected to the source device 400 via the USB cable 402.

The bus switch 204 is inserted between the VBUS pin and the main power supply 220. Once an initial negotiation between the electronic device 200 and the target device 400 is completed, the bus switch 204 is turned on to supply a bus voltage $V_{BUS}$ to the main power supply 220. For example, the port controller 300 turns on/off the bus switch 204 in response to an instruction from the main controller 210.

The main controller 210 includes a processor that universally controls the electronic device 200, and includes, for example, a microcontroller or a system-on-chip (SoC).

The port controller 300 is a functional integrated circuit (IC) including a power supply pin VDD, a CC pins CC1 and CC2, a ground pin GND, a switch control pin SWCNT and an interface pin IF. The power supply pin VDD, the ground pin GND, the pin CC1 and the pin CC2 are connected to corresponding pins of the receptacle. The interface pin IF is connected to the main controller 210. A SWCNT pin is connected to a control terminal of the bus switch 204.

The port controller 300 is installed with a physical layer and a logical layer (protocol) needed for communications with the target device 400. The port controller 300 negotiates with the target device 400 based on information received from the main controller 210. The information includes intrinsic power requirements of the electronic device 200.

Moreover, the port controller 300 includes a power supply output pin VOUT. A power supply voltage $V_{DD2}$ is output from the power supply output pin VOUT. The main controller 210 is operable based on a power supply voltage $V_{DD1}$ generated by the main power supply 220 when the main power supply 220 operates and is operable based on the power supply voltage $V_{DD2}$ generated by the port controller 300 when the main power supply 220 is inoperative. For example, the two power supply voltages $V_{DD1}$ and $V_{DD2}$ may be supplied to a power terminal of the main controller 210 via a diode OR (or gate) circuit, or one between the two power supply voltages $V_{DD1}$ and $V_{DD2}$ may be selected by a selector (switch).

The overall configuration of the electronic device 200 is described above. Next, the configuration of the port controller 300 is described below.

Figure 2:
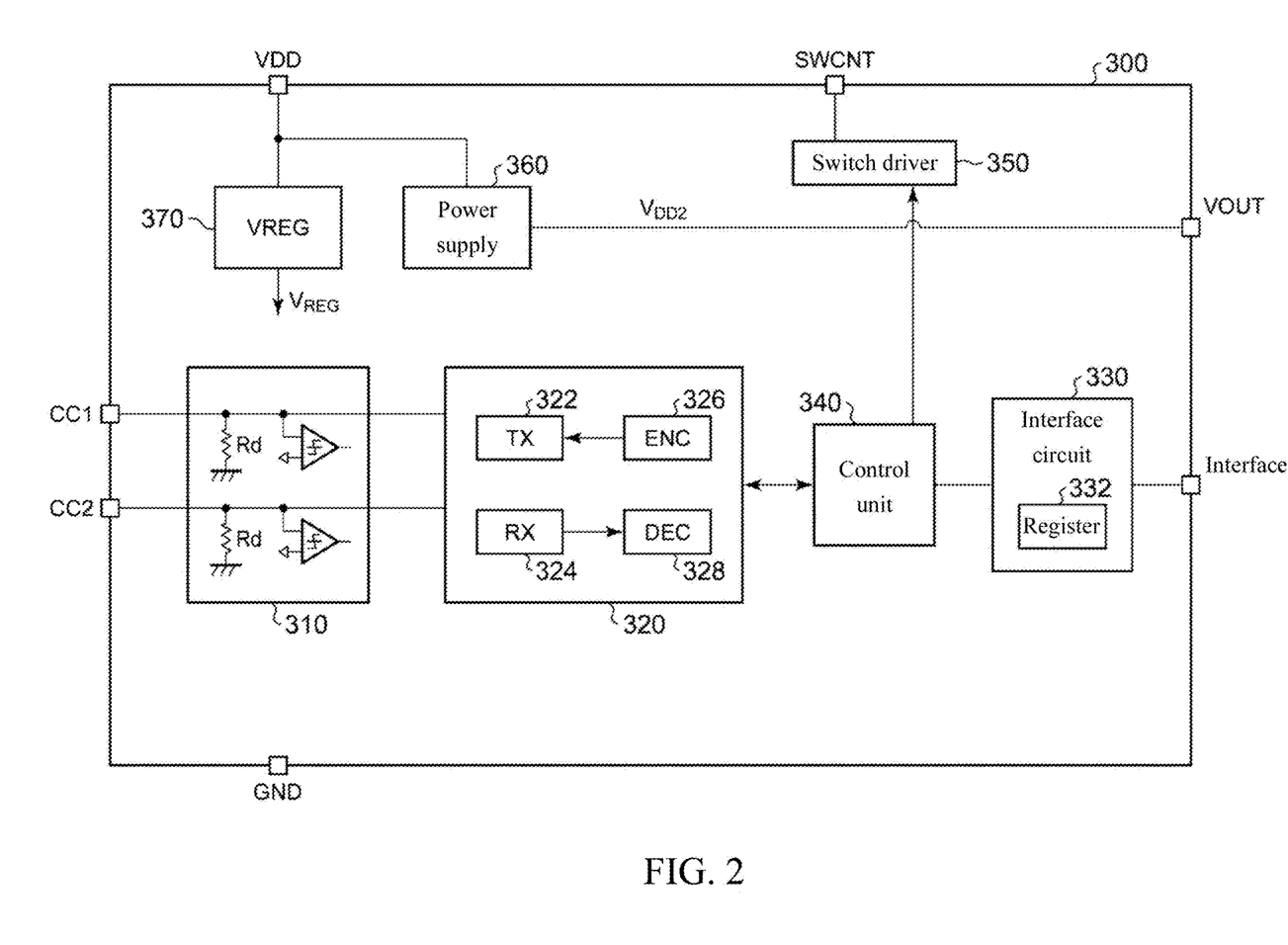
FIG. 2 is a block diagram of a port controller according to an embodiment.

FIG. 2 shows a block diagram of the port controller 300 according to an embodiment. The port controller 300 is compatible with the USB Type-C standard. As shown in FIG. 1, the port controller 300 can be used in the electronic device 200 operable as a sink device and is installed with a physical layer and a logical layer.

The port controller 300 includes a pin control circuit 310, a transceiver 320, an interface circuit 330, a control unit 340, a switch driver 350, an external power supply 360 and an internal power supply 370.

The pin control circuit 310 is a front-end module connected to the CC1 pin and the CC2 pin, controls states of the CC1 and CC2 pins, and monitors the state of theses CC pins.

The role (source/sink) of the electronic device 200 is determined according to the states (pulled up or pulled down) of the CC1 pin and the CC2 pin. The pin control circuit 310 includes hardware (for example, a pull-down resistor Rd) for specifying the role of the electronic device 200, or hardware (for example, a voltage comparator) for determining a target device. The internal configuration of the pin control circuit 310 may be implemented by commonly techniques, and such description is thus omitted.

The transceiver 320 communicates according to a start of packet (SOP), and has a transmitter 322, a receiver 324, an encoder 326 and a decoder 328. The encoder 326 and the decoder 328 are compatible with biphase mark coding (BCM). The encoder 326 encodes data generated by the control unit 340, and the transmitter (a line driver) 322 transmits encoded signals. Signals received by the receiver 324 are decoded by the decoder 328 and transmitted to the control unit 340.

The control unit 340 universally controls the port controller 300. The main function of the control unit 340 is to negotiate with the source device 400 by using the transceiver 320. The control unit 340, for example, is installed by a combination of a software program and a processor. Moreover, the control unit 340 acquires from the main controller 210 intrinsic information of the electronic device 200 needed for a negotiation. The information acquired from the main controller 210 is referred to as external information. From another perspective, the port controller 300 initializes the external information from the main controller 210 into initial values.

The external information, specifically, may include power data required by the electronic device 200. The form of the power data is not specifically defined and may be in a form selected from multiple power data objects (PDOs) below. For example, the power data may include a list of the required bus voltage $V_{BUS}$ and current.

The interface circuit 330 is communicable with the main controller 210. The interface circuit 330 provides data communication between the control unit 340 and the main controller 210.

The type of the interface circuit 330 is not specifically defined, and such as inter-integrated circuit (I²C) or serial peripheral interface (SPI) may be used. In FIG. 2, one IF (interface) pin is depicted. The IF pin in brief represents a clock terminal SCL and a data terminal SDA in the I²C interface, and briefly represents a chip selection terminal CS, a clock terminal SCLK, a data input terminal SDI and a data output terminal SDO in the SPI.

The interface circuit 330 may include a register 332. The main controller 210 communicates with the interface circuit 330 and writes data including the external information to the register 332. The control unit 340 reads the data that the main controller 210 writes to the register 332 and uses the data for the negotiation.

In FIG. 2, the transceiver 320 and the control unit 340 are depicted as having a direct connection in between for illustration purposes. The data exchange between the transceiver 320 and the control unit 340 may also be performed by using the interface circuit 330 (the register 332). That is to say, the transceiver 320 writes the received data to the register 332, and the controller 340 is capable of reading the data from the register 332. Conversely, the controller 340 writes the data that should be sent to the source device 400 to the register 332, and the transceiver 320 is capable of sending data written to the register 332 to the source device 400.

The data that the main controller 210 writes to the register 332 may also include a control signal for turning on/off the bus switch 204. Once the electronic device 200 enters a state of being capable of safely performing an operation, the main controller 210 provides to the port controller 300 an instruction for turning on the bus switch 204. The control unit 340 controls the switch driver 350 in response to the instruction for the switch driver 350 to turn on the bus switch 204.

Moreover, the data that the transceiver 320 receives from the source device is written to the register 332. The main controller 210 is, by accessing the register 332, capable of reading data that the transceiver 320 receives from the source device.

The port controller 300 may also store such as error information in the register 332. The main controller 210 accesses the register 332 to acquire the error information.

The internal circuit 370 is connected to the VDD (power supply voltage) pin and receives the bus voltage $V_{BUS}$. The internal power supply 370 generates and supplies a stabilized power supply voltage $V_{REG}$ to at least one module in the port controller 300.

The external power supply 360 is also connected to the VDD pin and receives the bus voltage $V_{BUS}$. The external power supply 360 generates and outputs the stabilized external power supply voltage $V_{DD2}$ from the power supply output pin VOUT. The voltage level of the external power supply voltage $V_{DD2}$ is determined according to the specifications of the main controller 210.

The configuration of the port controller 300 is described above.

Figure 3:
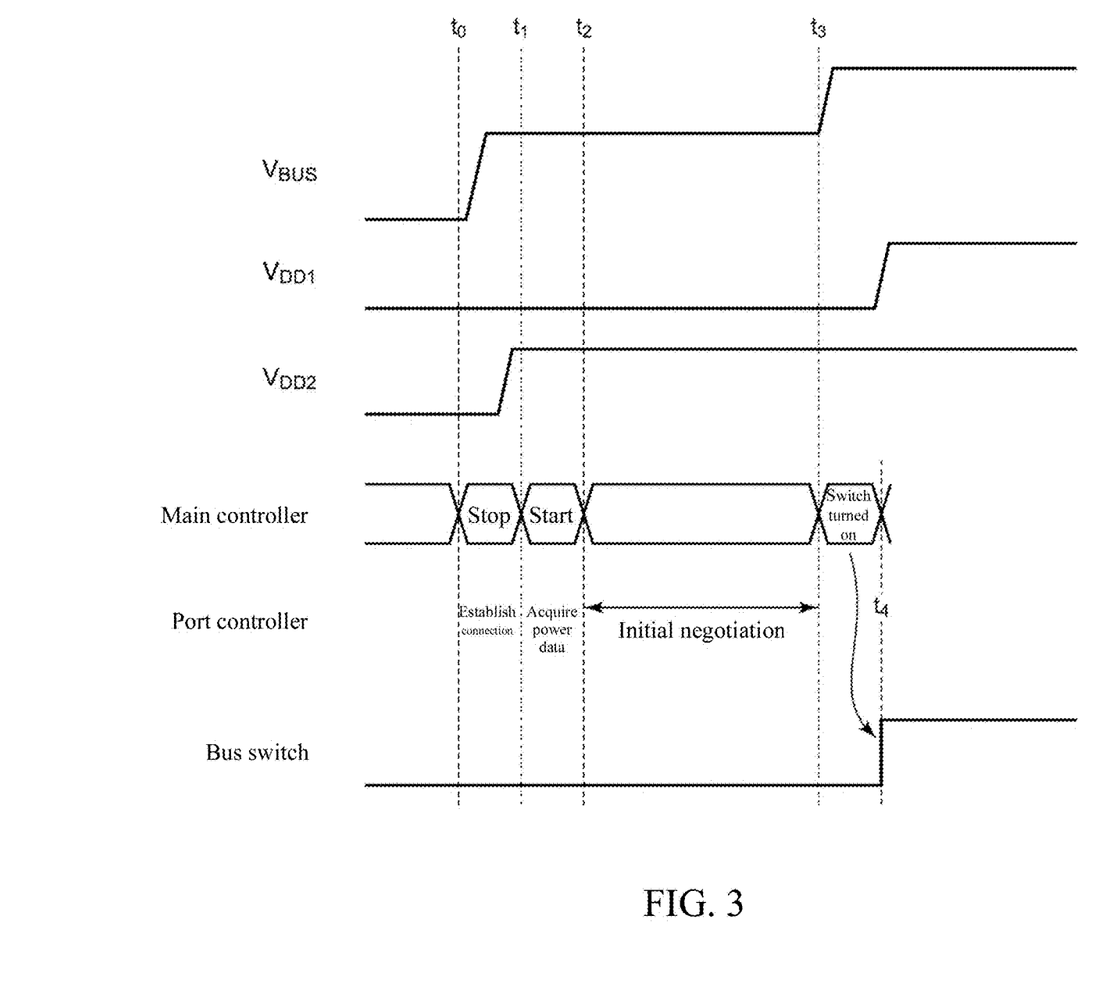
FIG. 3 is a timing diagram of operations of the port controller in FIG. 2.

Next, the operation of the port controller 300 is described below. FIG. 3 shows a timing diagram of operations of the port controller 300 in FIG. 2.

1. Initial State

In the initial state (before t0), the battery 222 is fully discharged, and the electronic device 200 is inoperable. In this state, a device having a source function is connected to the receptacle 202 through a USB cable.

2. Establishment of Source-to-Sink Relationship

A target device to become the source device establishes a connection with a sink device ($t_0$ to $t_1$) based on the states of the CC1 and CC2 pins. More specifically, the target device determines according to the presence of the pull-down resistor Rd included in the electronic device 200 whether the electronic device 200 is a sink device. When the target device detects the presence of the pull-down resistor Rd and determines the electronic device 200 as a sink device, a connection is regarded as established, and it outputs the predetermined 5 V bus voltage $V_{BUS}$.

The bus voltage $V_{BUS}$ output by the target device is supplied to the power supply pin VDD of the port controller 300, thereby enabling the port controller 300 to operate. The port controller 300 of the electronic device 200 determines whether the target device is a source device based on the states of the CC1 and CC2 pins. More specifically, the pin control circuit 310 of the port controller 300 detects a boost resistance Rp of the counterpart based on the voltages of the CC1 pin and the CC2 pin. The pin control circuit 310 determines that the connection with the counterpart is established under conditions that the bus voltage $V_{BUS}$ is supplied and the boost resistor Rp of the target device is detected. The boost resistor Rp of the target device (source device) differs depending on current values (3 A, 1.5 A, 500 mA). The CC pins generate a voltage divided according to Rp and Rd, so the pin control circuit 310 can detect a resistance value of the boot resistor Rp, that is, a current value, according to the voltage of the CC pins.

In this phase, the main controller 210 does not operate, and the port controller 300 is incapable of receiving an instruction for turning on the bus switch 204, so the bus switch 204 is turned off. That is to say, the bus voltage $V_{BUS}$ is not supplied to the main power supply 220, and the power supply voltage $V_{DD1}$ is not generated.

The port controller 300 that receives the bus voltage $V_{BUS}$ from the power supply pin VDD generates and supplies the power supply voltage $V_{DD2}$ to the main controller 210 (the timing $t_1$). More specifically, the external power supply 360 of the port controller 300 receives the 5 V bus voltage $V_{BUS}$ and generates the power supply voltage $V_{DD2}$. The main controller 210 is started by using the power supply voltage $V_{DD2}$.

In an initialization sequence included in (or not included) in a startup sequence of the main controller 210, the main controller 210 writes the external information needed for the negotiation to the register 332 of the port controller 300, such that the data stored in the register 332 of the port controller 300 is initialized.

The process up to this point does not involve communication of the CC pins.

3. Initial Negotiation (Power Supply Negotiation).

The initial negotiation ($t_2$ to $t_3$) is to be performed next. In this phase, the startup of the main controller 210 is completed, and the electronic device 200 possesses the power data needed for the initial negotiation.

The target device determines whether the electronic device 200 is compatible with USB PD. The target devices communicate by using a CC line and transmits a data packet (source-capabilities) including a corresponding PDO to the electronic device 200. The PDO specifies combinations of a voltage and a current that can be supplied thereby. When the electronic device 200 is compatible with USB PD, the electronic device 200 returns a response to the PDO from the target device. When the electronic device 200 is not compatible with USB PD, no response with respect to the PDO is returned, so that target device can accordingly determine that the electronic device 200 is not compatible with USB PD.

The transceiver 320 of the electronic device 200 receives the data packet including the PDO. The data is referenced by the control unit 340. In the register 332, the external information written by the main controller 210, that is, the power data of power (voltage and current) required by the electronic device 200 is stored.

The control unit 340 selects one of a plurality of PDOs based on the power data stored in the register 332, and then returns an identifier (serial number) representing the selected PDO to the transceiver 320. The transceiver 320 sends the data packet (request message) including the identifier of the PDO to a source device 400 serving as the target device.

Upon receiving the request message, the target device determines the voltage and current to be supplied based on the data included in the request message. Then, the voltage level of the bus voltage VBUS is set to a voltage level determined by the negotiation.

4. Control of the Bus Switch 204

Once the initial negotiation is completed, in a state in which the bus voltage VBUS at a voltage level determined via the negotiation is stabilized, the main controller 210 provides to the port controller 300 an instruction for turning on the bus switch 204 ($t_3$). In response to the instruction, the port controller 300 turns on the bus switch 204 (timing $t_4$). As a result, the bus voltage $V_{BUS}$ at a voltage level determined via the negotiation is supplied to the main power supply 220. The main power supply 220 receives the bus voltage $V_{BUS}$, charges the battery 220, and generates and supplies the power supply voltage $V_{DD1}$ to the main controller 210 or other circuit blocks. Herein, the entire electronic device 200 is started, and the startup from a powerless battery state is completed.

5. Subsequent Negotiation

After the startup of the main controller 210, a plurality of negotiations may be generated, and these negotiations are also performed by the port controller 300 based on the information acquired from the main controller 210.

For example, when the electronic device 200 can exchange between both roles of a host and a source, it needs to be compatible with the protocols for role exchange of power supply. The function of the negotiation associated with switching of the role exchange of power supply is installed in the control unit 340 of the port controller 300. After the port controller 300 receives a request for role exchange of power supply from the source device 400, the request is sent to the main controller 210 to designate the controller 210 to determine whether the role exchange of power supply can be performed. The main controller 210 writes a flag indicating yes or no to the register 332. The port controller 300 performs the negotiation with the source device 400 based on the flag written to the register 332.

Moreover, in USB PD3.0 options, a standard referred to as programmable power supply (PPS) is specified. When the electronic device 200 is compatible with PPS, related functions of communication associated with PPS are also installed in the port controller 300. The main controller 210 adapts to the voltage of the battery 222 or an operation state of the electronic device 200, such that the voltage level of the required bus voltage $V_{BUS}$ change constantly. When there is a change in the voltage level of the required bus voltage $V_{BUS}$, the main controller 210 writes required voltage information to the register 332. The port controller 300 performs the negotiation with the source device 400 based on the voltage information written to the register 332.

The operations of the port controller 300 and the electronic device 200 are described above.

Figure 4:
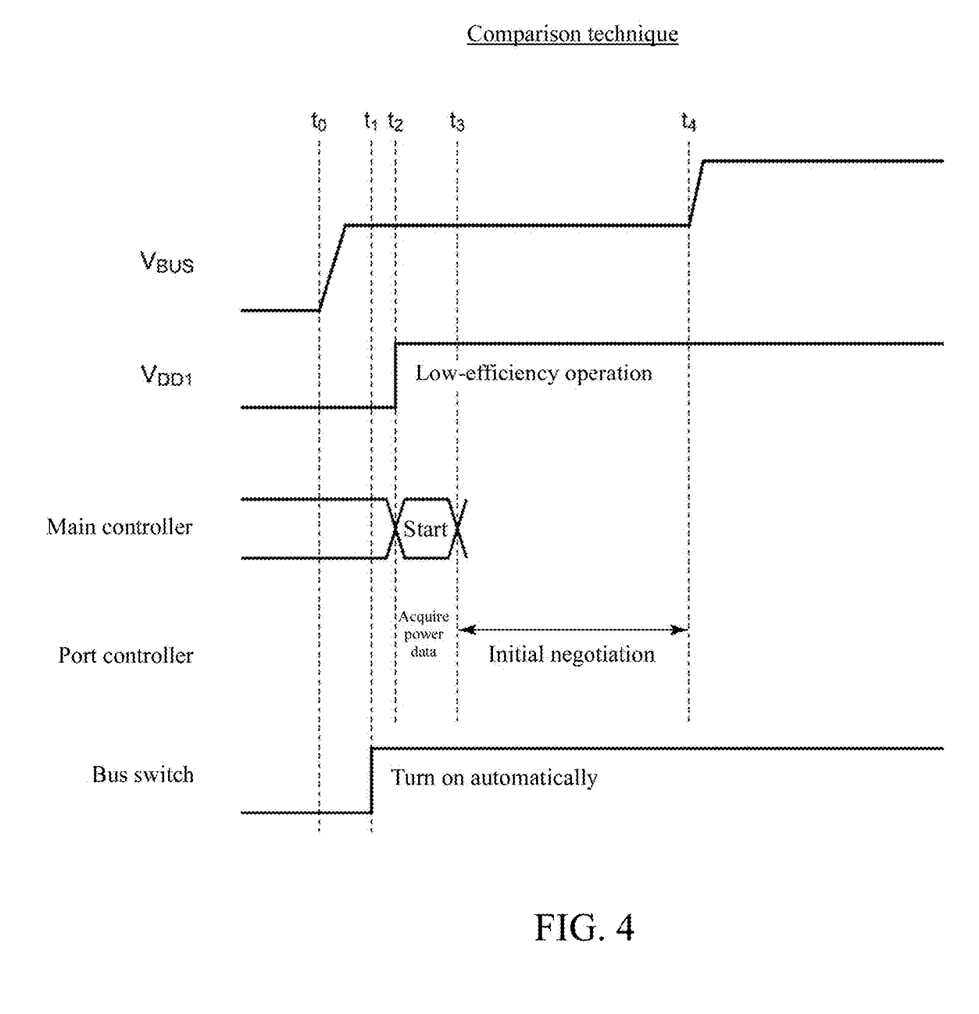
FIG. 4 is a timing diagram of operations of a port controller of a comparison technique.

The advantages of the port controller 300 of the embodiment become readily more apparent in a comparison with a comparison technique. FIG. 4 shows a timing diagram of operations of a port controller of a comparison technique. A port controller of the comparison technique does not use the external power supply 360, and instead, has a function of turning on the bus switch in a manner irrelevant to the control from the main power supply 220 when supplied with the bus voltage $V_{BUS}$.

1. Initial State

A state before the timing to is the initial state, in which the battery 222 is fully discharged, and the electronic device 200 is inoperable. In this state, a device having a source function is connected to the receptacle 202 through a USB cable.

2. Establishment of Source-to-Sink Relationship

A target device to become the source device establishes a connection with a sink device ($t_0$ to $t_1$) based on the states of the CC1 and CC2 pins. More specifically, the target device determines according to the presence of the pull-down resistor Rd included in the electronic device 200 whether the electronic device 200 is a sink device. When the target device detects the presence of the pull-down resistor Rd and determines the electronic device 200 as a sink device, a connection is regarded as established, and it outputs the predetermined 5 V bus voltage $V_{BUS}$.

The port controller has the bus switch be automatically turned on at the timing $t_1$ upon receiving the bus voltage $V_{BUS}$ from the power supply pin VDD. Thus, the bus voltage $V_{BUS}$ in 5 V is supplied to the main power supply 220.

At the timing $t_2$, the main power supply 220 generates and supplies the power supply voltage $V_{DD1}$ to the main controller 210. Thus, the main controller 210 is started. In an initialization sequence included in (or not included) in a startup sequence of the main controller 210, the main controller 210 writes the external information needed for the negotiation to the register 332 of the port controller 300, such that the data stored in the register 332 of the port controller 300 is initialized.

3. Initial Negotiation (Power Supply Negotiation).

The initial negotiation ($t_2$ to $t_3$) is to be performed next. In this phase, the startup of the main controller 210 is completed, and the electronic device 200 possesses the power data needed for the initial negotiation. The port controller performs the negotiation with the source device 400 based on the power data. As a result, at the timing $t_4$, the source device 400 starts supplying the bus voltage VBUS at a voltage level determined via the negotiation.

In the comparison technique, in a manner irrelevant to an instruction of the main controller, that is, regardless of the state of the internal circuit of the electronic device 200, the bus switch 204 is automatically turned on. Thus, it may be said that there is an issue from the perspective of reliability.

Moreover, the internal system including the main controller 210 is controlled to operate by the predetermined 5 V bus voltage $V_{BUS}$ before the initial negotiation, and thus efficiency is degraded. That is to say, when the bus switch 204 is turned on in a state where the bus voltage $V_{BUS}$ of 5 V is not optimal, the main power supply 220 operates in a low-efficiency state, and power consumption of the electronic device 200 is increased. In addition, given the same power received, the current flowing in a bus line with a lower bus voltage $V_{BUS}$ increases, so heat generation and power loss due to the parasitic resistance of the bus switch 204 or the bus line also increase.

In contrast, in the port controller 300 of the embodiments, the bus switch 204 is turned on only when the optimal bus voltage $V_{BUS}$ is supplied. Thus, compared to the comparison technique, highly efficient operations can be achieved. Moreover, the bus switch 204 is turned on based on the instruction of the main controller 210. The main controller 210 generates an instruction for turning on the switch bus 204 by using a condition that the internal circuit of the electronic device 200 is in a safe state, and accordingly provides enhanced reliability compared to the comparison technique.

While the embodiments are exemplary, a person skilled in the art would be able to understand that there are various variation examples of combinations of the constituting elements and processes of these embodiments. Details of such variation examples are given in the description below.

Variation Example 1

In the embodiments, the control unit 340 is installed by using a processor and a software program; however, it may also be constituted by a hardware logic.

Variation Example 2

In the embodiments, the function of the source is described in focus with regard to the port controller 300. However, the port controller 300 can correspond to both roles, and in this case, the pin control circuit 310 is added with a component (boost resistor Rp) associated with the sink or a comparator and a VCONN voltage generating circuit.

Variation Example 3

In the embodiments, the switch driver 350 turns on the bus switch 204 in response to the instruction from the main controller 210; however, the present disclosure is not limited to the example above. The switch driver 350 may also automatically turn on the bus switch 204 once the initial negotiation is completed. In this case, the main controller 210 also monitors the state of the internal circuit of the electronic device 200 in the startup sequence and provides instruction to the port controller 300 for performing the initial negotiation only in a condition without any abnormality. Thus, in the presence of abnormality, the initial negotiation is not performed, so the bus switch 204 is not turned on, resulting in no damaged in reliability.

While the embodiments are exemplary, a person skilled in the art would be able to understand that there are various variation examples of combinations of the constituting elements and processes of these embodiments, and such variation examples are to be encompassed within the present disclosure or the scope of the present disclosure.

The invention claimed is:

1. A port controller, compatible with USB (Universal Serial Bus) Type-C standard and used in a device operable as a sink device, the port controller comprising:
    an interface circuit, communicable with an external main controller of the device;
    a transceiver, communicable with a source device via a configuration channel pin of a receptacle;
    a control unit, negotiable with the source device via the transceiver;
    a pin control circuit, operable to control a state of the CC pin and monitoring the state of the CC pin; and
    a power supply circuit, operable to receive a bus voltage supplied from the source device and generate a first power supply voltage to the external main controller before the device is at a startup state,
    wherein when the device is at the startup state, the external main controller is operable to receive a second power supply voltage according to the bus voltage instead of the first power supply voltage.

2. The port controller of claim 1, further comprising a switch driver operable to control a bus switch connected to a VBUS pin of the receptacle, wherein the switch driver is operable to turn on the bus switch in response to an instruction from the main controller.

3. The port controller of claim 1, further comprising a switch driver operable to control a bus switch connected to a VBUS pin of the receptacle, wherein the control unit is operable to instruct the switch driver to turn on the bus switch after an initial negotiation is completed.

4. An electronic device, compatible with USB Type-C standard and used in a device operable as a sink device, the electronic device comprising:
   a receptacle,
   a main controller; and
   the port controller of claim 1, which is connected to the receptacle and the main controller.

5. An electronic device, compatible with USB Type-C standard and used in a device operable as a sink device, the electronic device comprising:
   a receptacle,
   a main controller; and
   the port controller of claim 2, which is connected to the receptacle and the main controller.

6. An electronic device, compatible with USB Type-C standard and used in a device operable as a sink device, the electronic device comprising:
   a receptacle,
   a main controller; and
   the port controller of claim 3, which is connected to the receptacle and the main controller.

* * * * *